（12）United States Patent
Fabre et al.

(10) Patent No.: US 11,181,011 B2
(45) Date of Patent: Nov. 23, 2021

(54) LIGHTER-WEIGHT CASING MADE OF COMPOSITE MATERIAL AND METHOD OF MANUFACTURING SAME

(71) Applicants: SAFRAN AIRCRAFT ENGINES, Paris (FR); SAFRAN, Paris (FR)

(72) Inventors: Hubert Jean-Marie Fabre, Moissy-Cramayel (FR); Jérémy Hellot, Moissy-Cramayel (FR); Antoine Phelippeau, Moissy-Cramayel (FR); Yann Didier Simon Marchal, Moissy-Cramayel (FR); Bruno Jacques Gérard Dambrine, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 463 days.

(21) Appl. No.: 16/063,366

(22) PCT Filed: Dec. 21, 2016

(86) PCT No.: PCT/FR2016/053602
§ 371 (c)(1),
(2) Date: Jun. 18, 2018

(87) PCT Pub. No.: WO2017/109403
PCT Pub. Date: Jun. 29, 2017

(65) Prior Publication Data
US 2020/0271015 A1 Aug. 27, 2020

(30) Foreign Application Priority Data
Dec. 22, 2015 (FR) .................................. 1563102
Dec. 22, 2015 (FR) .................................. 1563116

(51) Int. Cl.
F01D 25/24 (2006.01)
B29C 70/24 (2006.01)
(Continued)

(52) U.S. Cl.
CPC .............. F01D 25/24 (2013.01); B29C 70/24 (2013.01); B29C 70/32 (2013.01); B29C 70/48 (2013.01);
(Continued)

(58) Field of Classification Search
None
See application file for complete search history.

(56) References Cited

U.S. PATENT DOCUMENTS 9,988,156 B2 *  6/2018  Tanaka .................. B29C 70/446
10,443,617 B2 * 10/2019  Finnigan ................ B29C 70/24
(Continued)

FOREIGN PATENT DOCUMENTS

EP    1 104 837 A2    6/2001
EP    1 961 923 A2    8/2008

OTHER PUBLICATIONS

International Search Report as issued in International Patent Application No. PCT/FR2016/053602, dated Apr. 24, 2017.

Primary Examiner — Michael Lebentritt
Assistant Examiner — Jason G Davis
(74) Attorney, Agent, or Firm — Pillsbury Winthrop Shaw Pittman LLP

(57) ABSTRACT

A method of fabricating a composite material casing of varying thickness for a gas turbine includes using three-dimensional or multilayer weaving to make a fiber texture in the form of a strip; winding the fiber texture as a plurality of superposed layers onto a mandrel of profile corresponding to the profile of the casing to be fabricated, so as to obtain a fiber preform of shape corresponding to the shape of the
(Continued)

casing to be fabricated; and densifying the fiber preform with a matrix. During winding of the fiber texture on the mandrel, a textile strip is interposed between the adjacent turns of the fiber texture, the textile strip presenting a width that is less than the width of the fiber texture and defining a retention zone of the casing.

14 Claims, 6 Drawing Sheets

(51) Int. Cl.
*B29C 70/32* (2006.01)
*B29C 70/48* (2006.01)
*B32B 3/12* (2006.01)
*B32B 5/02* (2006.01)
*B32B 5/18* (2006.01)
*B32B 5/26* (2006.01)
*B32B 27/12* (2006.01)
*B32B 5/24* (2006.01)

(52) U.S. Cl.
CPC ............... *B32B 3/12* (2013.01); *B32B 5/024* (2013.01); *B32B 5/18* (2013.01); *B32B 5/245* (2013.01); *B32B 5/26* (2013.01); *B32B 27/12* (2013.01); *B32B 2250/44* (2013.01); *B32B 2255/02* (2013.01); *B32B 2260/023* (2013.01); *B32B 2260/046* (2013.01); *B32B 2605/18* (2013.01); *F05D 2300/60* (2013.01)

(56) References Cited

U.S. PATENT DOCUMENTS

| | | | |
|---|---|---|---|
| 2006/0093847 A1* | 5/2006 | Hornick | F02K 3/04 428/523 |
| 2009/0202763 A1 | 8/2009 | Rose et al. | |
| 2012/0099981 A1 | 4/2012 | Verseux et al. | |
| 2013/0082417 A1 | 4/2013 | Gummel et al. | |
| 2015/0314556 A1* | 11/2015 | Xie | B32B 5/12 428/113 |
| 2016/0031182 A1* | 2/2016 | Quinn | B29C 70/688 428/113 |
| 2016/0169044 A1* | 6/2016 | Clarkson | F01D 21/045 415/196 |

\* cited by examiner

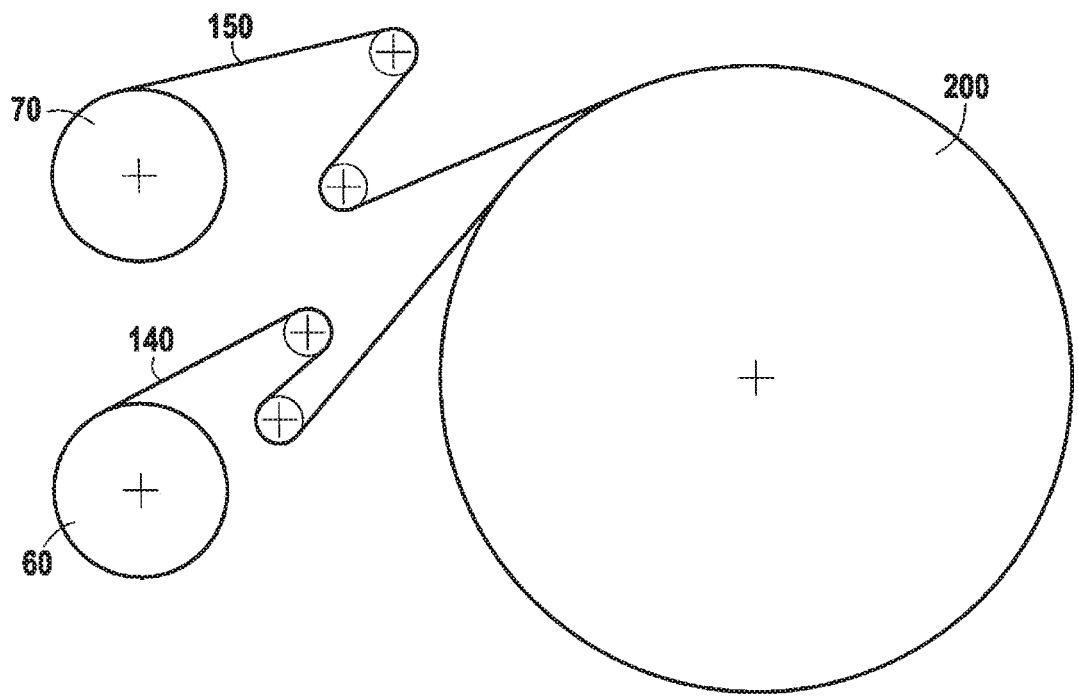
FIG.5
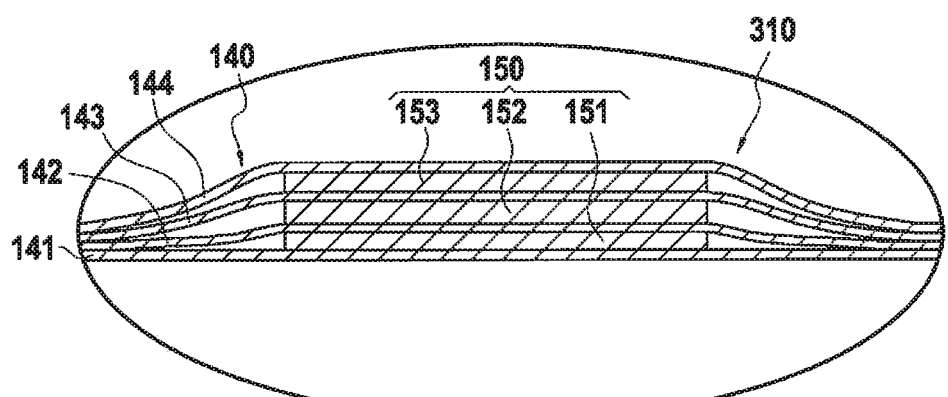
FIG.6
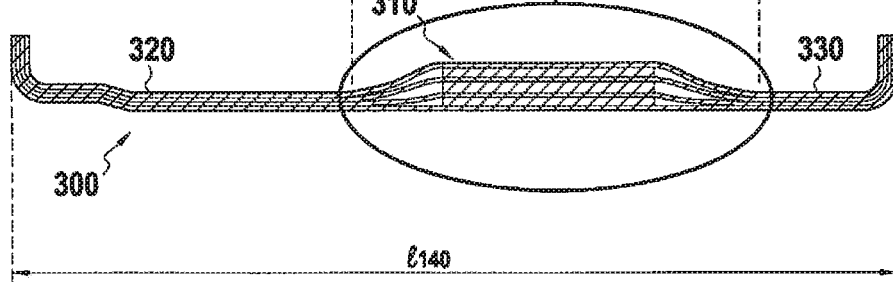

LIGHTER-WEIGHT CASING MADE OF COMPOSITE MATERIAL AND METHOD OF MANUFACTURING SAME

CROSS REFERENCE TO RELATED APPLICATIONS

This application is the U.S. National Stage of PCT/FR2016/053602, filed Dec. 21, 2016, which in turn claims priority to French Application No. 1563102, filed Dec. 22, 2015 and French Application No. 1563116, filed Dec. 22, 2015. The contents of both applications are incorporated herein by reference in their entirety.

BACKGROUND OF THE INVENTION

The invention relates to gas turbine casings, and more particularly but not exclusively to gas turbine fan casings for aeroengines.

In a gas turbine aeroengine, the fan casing performs several functions. It defines the air inlet passage into the engine, it supports an abradable material facing the tips of the fan blades, it supports an optional soundwave absorber structure for acoustic treatment at the inlet to the engine, and it incorporates or supports a retention shield. The retention shield constitutes a debris trap for retaining debris such as ingested objects or fragments of damaged blades that are projected by centrifuging, in order to prevent them from passing though the casing and reaching other portions of the aircraft.

Casings, such as fan casings, used to be made of metal material, but they are now made out of composite material, i.e. from a fiber preform that is densified by an organic matrix, which makes it possible to fabricate parts of overall weight that is lower than that of the same parts when they are made of metal material, while still presenting mechanical strength that is at least equivalent, if not greater.

Fabrication of a fan casing out of organic matrix composite material is described in particular in Document US 2013/082417. In the casing disclosed in Document US 2013/082417, the retention shield is constituted by a thicker portion obtained in the fiber reinforcement of the casing, which reinforcement presents thickness that varies. The fiber reinforcement is obtained by winding a 3D woven fiber texture in which a progressive increase in thickness is obtained by changing the size of the warp yarns or strands.

FIG. 8 shows a fan casing 50 made of composite material that includes a retention shield or zone 51 that constitutes the portion of greater thickness of the casing, in which portion the fiber reinforcement comprises warp yarns or strands of larger diameter. The retention zone 51 is surrounded by two adjacent transition zones 52 and 53 that include both warp yarns or strands of large diameter as in the portion 51 and also warp yarns or strands of smaller diameter. The proportion of warp yarns or strands increases progressively in the portions 52 and 53 on approaching the retention zone 51. Finally, the casing 50 includes portions 54 and 55 that are further away from the retention zone 51 and that have only warp yarns or strands of small diameter.

Nevertheless, with that fabrication technique, the extent to which the fiber reinforcement can be made thicker in the retention zone is limited firstly by the weavability of a texture having strands of diameter that is too great (or too small) (weavability limit for 3D woven fabrics), and secondly by the maximum acceptable warp-weft ratio (WWR). Concerning the WWR, for example when fabricating a casing, the weft yarns are continuous, such that the WWR changes automatically as soon as the size or the count of the warp yarns is changed.

OBJECT AND SUMMARY OF THE INVENTION

It is thus desirable to have a solution for providing a composite material casing that has a retention zone in which the maximum amplitude of the extra thickness is not determined by a weavability limit and in which the warp-weft ratio can be controlled so as to avoid exceeding a determined maximum threshold.

To this end, the invention proposes a method of fabricating a composite material casing of varying thickness for a gas turbine, the method comprising:
- using three-dimensional or multilayer weaving to make a fiber texture in the form of a strip;
- winding the fiber texture as a plurality of superposed layers onto a mandrel of profile corresponding to the profile of the casing to be fabricated, so as to obtain a fiber preform of shape corresponding to the shape of the casing to be fabricated; and
- densifying the fiber preform with a matrix;

the method being characterized in that, during winding of the fiber texture on the mandrel, a textile strip or an aerated material is interposed between the adjacent turns of the fiber texture, the textile strip or the aerated material presenting a width that is less than the width of the fiber texture and defining a retention zone of the casing.

By interposing a textile layer in this way between the adjacent layers of the fiber texture used for forming the fiber reinforcement of the casing, it is possible to form within the casing a portion that presents the desired extra thickness suitable for constituting a retention shield or zone while also controlling the warp-weft ratio in this portion of the preform in such a manner as to avoid exceeding a predetermined value. Specifically, since the textile strip is independent of the fiber texture, it suffices to adjust the warp-weft ratio therein to obtain the intended overall warp-weft ratio in the preform. When fabricating a casing using the above-described prior art method, there is a quantity of weft yarns that is defined over the entire width of the preform (continuous weft) in such a manner that increasing the size or the number of weft strands has a direct impact on the warp-weft ratio. With the method of the invention, an independent textile strip is added and thus both warp and weft yarns are added, thereby making it possible to increase the thickness of the resulting preform without varying the warp-weft ratio. It is because the textile strip that is interposed between the wound fiber texture is of a width that is less than the width of said texture that it is possible to have a "quantity" of weft yarns that varies across the width while keeping a WWR that is relatively stable in spite of adding warp yarns.

The method of the invention also makes it possible to obtain a large amount of thickness variation in a retention zone that is to be formed in the casing, thereby minimizing the overall weight of the resulting casing compared with a casing in which the thicker portion is made by increasing the size of the warp yarns or strands.

The retention zone as formed in this way also performs its function reliably, i.e. retaining debris, particles, or objects ingested in the inlet of the engine, or resulting from damage to the fan blades and projected radially against the casing as a result of the fan rotating.

Likewise, by interposing an aerated material between the adjacent layers of the fiber texture used for forming the fiber reinforcement of the casing, it is possible to form a thicker portion in the casing that is suitable for constituting a retention shield or zone, while minimizing the overall weight of the resulting casing compared with a casing in which the thicker portion is made solely with a fiber texture presenting varying thickness as in the prior art.

The retention zone as formed in this way also serves to perform its function reliably, i.e. retaining debris, particles, or objects ingested in the inlet of the engine, or resulting from damage to the blades of the fan, and projected radially by rotation of the fan. Specifically, by alternating shielding layers, formed in this example by the layers of the fiber texture densified by a matrix, with layers of aerated material, a ballistic principle is applied whereby a plurality of shielding layers that are relatively thin and spaced apart present performance that is as good as or even better than a single shielding layer of large thickness. This principle is based on the fact that the first shielding layer reached by a projectile breaks up the projectile into a multitude of small projectiles of smaller energy that are easily stopped and retained by the following shielding layers. The aerated material can also contribute to a lesser extent to attenuating the energy of small projectiles.

According to a particular characteristic of the method of the invention, the fibers may be selected from at least one of the following types: carbon; glass; aramid; and ceramic. According to another particular characteristic of the method of the invention, the textile strip is made with fibers of the same type as the fibers of the fiber texture. This makes it possible to have better cohesion and better mechanical behavior between the fiber texture and the textile strip, while simplifying selection of the matrix precursor that is to be injected into the preform.

According to another particular characteristic of the invention, the textile strip is made with three-dimensional weaving having the same weave as the three-dimensional weaving of the fiber texture. This makes it possible to ensure that forces are transmitted effectively and uniformly between the fiber texture layers and the interposed textile strip layers, without zones in which stress or deformation becomes concentrated.

According to another particular characteristic of the invention, the textile strip presents a warp-weft ratio that is substantially identical to the warp-weft ratio of the fiber texture. Under such circumstances, the thicker portion of the fiber preform presents a warp-weft ratio similar to the warp-weft ratio present in the other portions of the preform.

According to another particular characteristic of the method of the invention, the aerated material is made from a foam that is preferably suitable for withstanding temperatures of about 200° C. and pressures of about 1 megapascal (MPa).

According to another particular characteristic of the method of the invention, the aerated material is made from a cellular structure that may be made in particular out of aluminum or aramid.

According to yet another particular characteristic of the method of the invention, after the winding step, the fiber preform comprises n layers of fiber texture corresponding to n winding revolutions of said fiber texture, and n−1 layers of aerated material corresponding to n−1 winding revolutions of said aerated material.

The invention also provides a gas turbine fan casing having varying thickness and made of a composite material with fiber reinforcement comprising a plurality of superposed layers of a fiber texture in the form of a strip presenting three-dimensional or multilayer weaving, said fiber reinforcement being densified by a matrix;

the casing being characterized in that a textile strip is interposed between two adjacent layers of the fiber texture, the textile strip presenting a width that is less than the width of the fiber texture and defining a retention zone of the casing.

According to a particular characteristic of the casing of the invention, the fibers of the fiber texture and the fibers of the textile strip are selected from at least one of the following types: carbon; glass; aramid; and ceramic.

According to a particular characteristic of the casing of the invention, the textile strip is made with fibers of the same type as the fibers of the fiber texture.

According to another particular characteristic of the casing of the invention, the textile strip presents three-dimensional weaving having the same weave as the three-dimensional weaving of the fiber texture.

According to another particular characteristic of the casing of the invention, the textile strip presents a warp-weft ratio that is substantially identical to the warp-weft ratio of the fiber texture.

According to another particular characteristic of the casing of the invention, the fiber reinforcement comprises n layers of fiber texture corresponding to n winding revolutions of said fiber texture, and n−1 layers of textile strip corresponding to n−1 winding revolutions of said textile strip.

According to a particular characteristic of the casing of the invention, the aerated material is made from a foam that is preferably suitable for withstanding temperatures of about 200° C. and pressures of about 1 MPa.

According to another particular characteristic of the casing of the invention, the aerated material is made from a cellular structure that may be made in particular out of aluminum or of aramid.

According to still another particular characteristic of the casing of the invention, the fiber reinforcement comprises n layers of fiber texture corresponding to n winding revolutions of said fiber texture, and n−1 layers of aerated material corresponding to n−1 winding layers of said aerated material.

The invention also provides a gas turbine aeroengine having a fan casing of the invention.

BRIEF DESCRIPTION OF THE DRAWINGS

Other characteristics and advantages of the invention appear from the following description of particular implementations and embodiments of the invention, given as non-limiting examples and with reference to the accompanying drawings, in which:

FIG. 5 is a diagrammatic view showing the fiber structure and the textile strip of FIG. 4 being wound simultaneously;

FIG. 6 is a section view in profile showing the fiber preform that is obtained after winding the fiber structure and the textile strip of FIGS. 4 and 5;

DETAILED DESCRIPTION OF IMPLEMENTATIONS AND EMBODIMENTS

The invention is described below in the context of its application to a gas turbine aeroengine fan casing.

Figure 1:
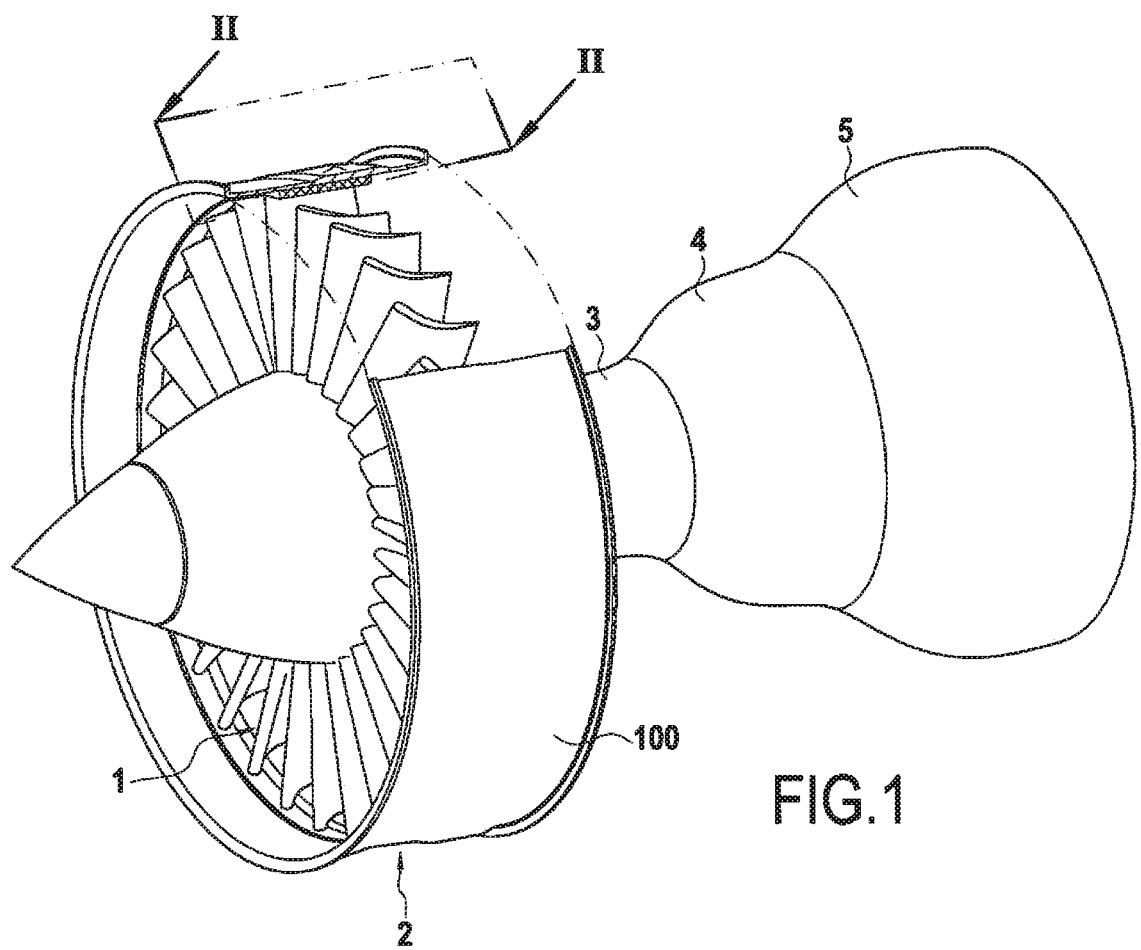
FIG. 1 is a partially cutaway perspective view of an aeroengine fitted with a fan casing made of composite material in an embodiment of the invention.

Such an engine, as shown very diagrammatically in FIG. 1, comprises going from upstream to downstream in the flow direction of the gas stream: a fan 1 arranged at the inlet of the engine; a compressor 2; a combustion chamber 3; a high pressure turbine 4; and a low pressure turbine 5.

The engine is housed inside a casing comprising a plurality of portions corresponding to different elements of the engine. Thus, the fan 1 is surrounded by a fan casing 100.

Figure 2:
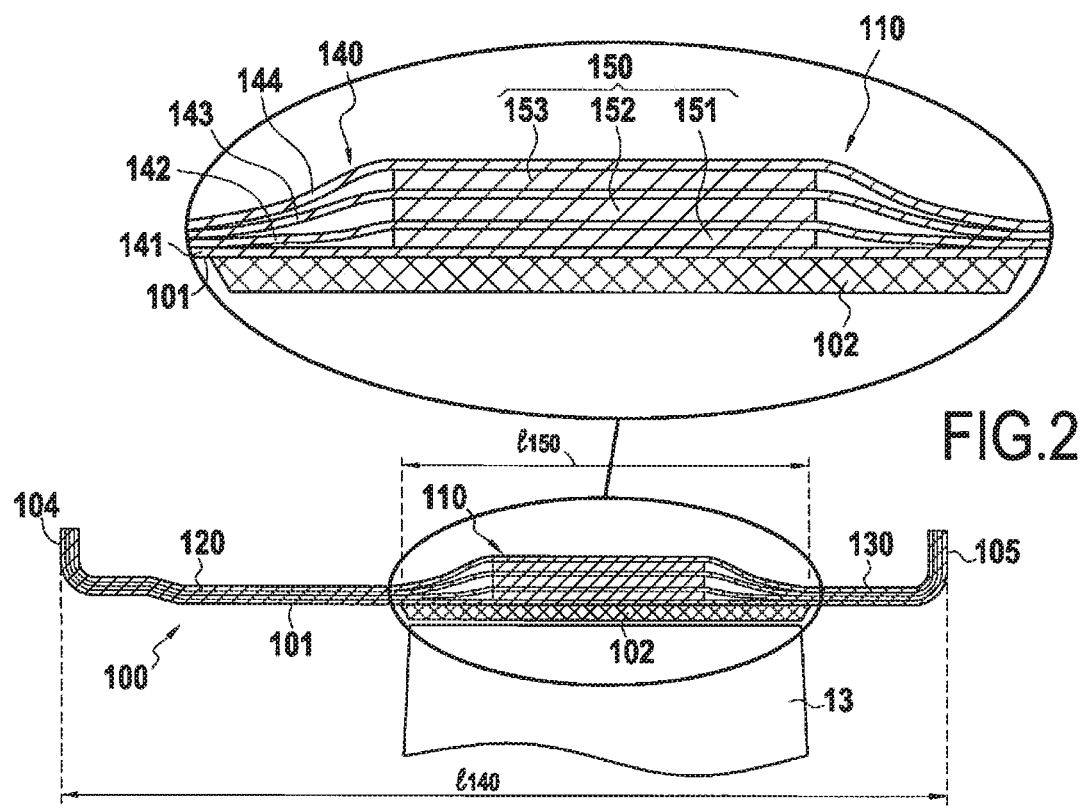
FIG. 2 is a section view on plane II-II of the FIG. 1 casing.

FIG. 2 is a profile view of the composite material fan casing 100 that can be obtained by a method of the invention. The inner surface 101 of the casing defines the air inlet passage. It may be provided with a layer of abradable material 102 in register with the path followed by the tips of the fan blades, one blade 13 being shown in part and in highly diagrammatic manner. The abradable coating is thus ranged over a portion only of the length (in the axial direction) of the casing. An acoustic treatment coating (not shown) may also be arranged on the inner surface 101, in particular upstream from the abradable coating 102.

The casing 100 may be provided with outer flanges 104 and 105 at its upstream and downstream ends so as to enable it to be mounted and connected to other elements. Between its upstream and downstream ends, the casing 100 is of varying thickness, the casing having a thicker portion 110 of thickness that is greater than its end portions 120 and 130 and that connects with them progressively.

The thicker portion 110 extends on either side of the location of the fan, both upstream and downstream, so as to form a retention shield or zone capable of retaining debris, particles, or objects ingested in the inlet of the engine, or coming from damage to blades of the fan, and projected radially by the rotation of the fan, in order to prevent them from passing through the casing and damaging other portions of the aircraft.

The casing 100 is made of composite material having fiber reinforcement densified by a matrix. The reinforcement is made of fibers that may for example be carbon, glass, aramid, or ceramic fibers, and the matrix is made of polymer, e.g. an epoxy, a bismaleimide, or a polyimide polymer, or of carbon, or of ceramic.

The fiber reinforcement is formed by winding a fiber texture made by three-dimensional weaving onto a mandrel, the texture being of varying thickness and the mandrel having a profile that corresponds to the profile of the casing that is to be made. Advantageously, the fiber reinforcement constitutes a complete tubular fiber preform of the casing 100 being made integrally with reinforcing portions that correspond to the flanges 104 and 105.

In accordance with the invention, the fiber reinforcement of the casing 100 is constituted by a plurality of superposed layers 141 to 144 of a fiber texture 140 in the form of a strip presenting three-dimensional or multilayer weaving, each layer 141 to 144 corresponding to one winding revolution of the fiber texture 140 (in FIG. 2, the layers 141 to 144 are densified by a matrix). In addition, a textile strip 150 is interposed between two adjacent layers of the fiber texture, the textile strip 150 presenting a width $l_{150}$ that is less than the width $l_{140}$ of the fiber texture 140 (FIG. 4) and defining the retention zone of the casing 100. In the presently-described example, three layers 151 to 153 of textile strip 150 are interposed between the superposed layers 141 to 144 of the fiber texture 140, each layer 151 to 153 corresponding to one winding revolution of the textile strip 150. In more general manner, for n layers of superposed fiber texture, each corresponding to one winding revolution of the fiber texture, there are n−1 layers of textile strip, each corresponding to one winding revolution of said textile strip.

By interposing a textile strip layer between the adjacent layers of the fiber texture used to form the fiber reinforcement of the casing, it is possible to form a thicker portion in the casing that is suitable for constituting a retention shield or zone, while minimizing the overall weight of the resulting casing compared with a casing in which the thicker portion is made only with a fiber texture in which the size of the yarns or strands is increased in order to form a thicker portion. As described in detail below, the casing of the invention may be fabricated more economically than a casing in which the variable thickness is obtained only with a fiber texture in which the size of its yarns or strands is caused to vary. Specifically, under such circumstances, it is necessary to use different types of yarn (yarns or strands of different weights), thereby increasing the cost of provisioning yarns. By enabling yarns or strands of the same type to be used, the method of the invention thus reduces provisioning costs, while simplifying the equipment needed for weaving and for winding. In addition, the method of the invention makes it possible to obtain casing shapes that are more complex, in particular in terms of thickness ratio, since varying the thickness does not give rise to any significant variation in the warp-weft ratio (WWR), since the warp yarns and the weft yarns can be of identical size throughout the fiber texture and in the textile strip.

Outside the thicker portion, the design of the casing of the invention also makes it possible to obtain portions that are significantly thinner than those obtained with prior art composite material casings. Specifically, in prior art casings, the portions adjacent to thicker portion correspond to transition zones in which the size of the yarns or strands is increased progressively, thereby giving rise to an increase in the thickness of these portions and to an increase in the overall weight of the resulting casing.

Preferably, but not exclusively, the textile strip may be made out of fibers of the same type as those used for making the fiber texture, thus making it possible to obtain consistent mechanical behavior between the fiber texture and the textile strip while also simplifying the selection of the matrix precursor that is to be injected into the preform.

Preferably, but not exclusively, the textile strip presents the same three-dimensional weave as the fiber texture, thus making it possible for forces to be transmitted effectively and uniformly between the fiber texture layers and the interposed textile strip layers without having a zone of stress or deformation concentration. Thus, the textile strip layers follow the movements of the fiber texture layer without impeding it, i.e. without giving rise to extra stresses, which would be more difficult to achieve with a textile strip having a weave that is different from that of the fiber structure.

Still preferably, but not exclusively, the textile strip and the fiber texture present a warp-weft ratio (WWR) substantially similar to that of the fiber texture. The percentage of variation in the WWR between the fiber texture and the textile strip is preferably ±10%, preferably ±5%, and in particularly preferred manner ±2%. The overall WWR in the fiber reinforcement of the casing preferably lies in the range 35% to 85%.

There follows a description of the method of fabricating the fan casing 100.

Figure 3:
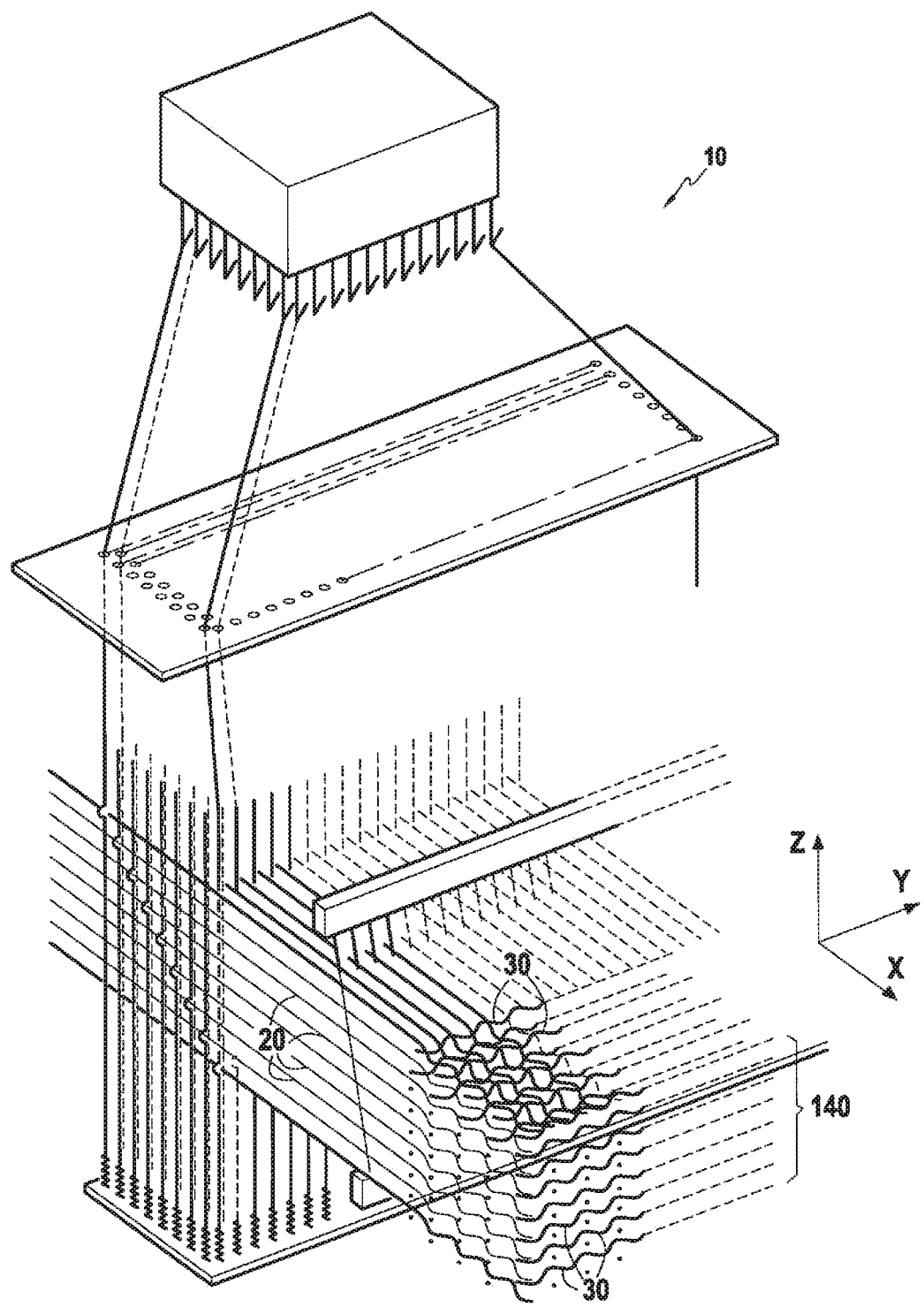
FIG. 3 is a diagrammatic perspective view of a loom showing the weaving of a fiber texture used for forming the fiber reinforcement of the casing of FIGS. 1 and 2.

As shown in FIG. 3, a fiber texture 140 is made in known manner by weaving using a Jacquard type loom 10 having a bundle of warp yarns or strands 20 in a plurality of layers, the warp yarns being interlinked by weft yarns or strands 30. The fiber texture is made by three-dimensional or multilayer weaving.

The term "three-dimensional weaving" or "3D weaving" is used herein to designate a weaving technique in which at least some of the weft yarns interlink warp yarns over a plurality of layers of weft yarns, or vice versa. An example of three-dimensional weaving is weaving with the so-called "interlock" weave. The term "interlock" weave is used herein to mean a weave in which each layer of warp yarns interlinks a plurality of layers of weft yarns, with all of the yarns in a given warp column having the same movement in the weave plane.

The term "multilayer" weaving is used herein to mean 3D weaving with a plurality of weft layers in which the basic weave of each layer is equivalent to a conventional 2D weave, such as a weave of plain, satin, or twill type, but in which certain points of the weave interlink the weft layers.

Making the fiber texture by 3D or multilayer weaving makes it possible while performing a single textile operation to obtain linking between the layers, and thus to have good mechanical strength for the fiber structure and for the resulting composite material part.

3D or multilayer weaves may in particular correspond to a weave selected from the following weaves: interlock, multi-plain, multi-satin, and multi-twill.

The term "multi-plain weave" is used herein to mean a 3D weave with a plurality of weft yarns in which the basic weave of each layer is equivalent to a conventional plain type weave, but in which certain points of the weave interlink the weft yarn layers.

The term "multi-satin weave" is used herein to mean a 3D weave with a plurality of weft yarns in which the basic weave of each layer is equivalent to a conventional satin type weave, but in which certain points of the weave interlink the weft yarn layers.

The term "multi-twill weave" is used herein to mean a 3D weave with a plurality of weft yarns in which the basic weave of each layer is equivalent to a conventional twill type weave, but in which certain points of the weave interlink the weft yarn layers.

Figure 4:
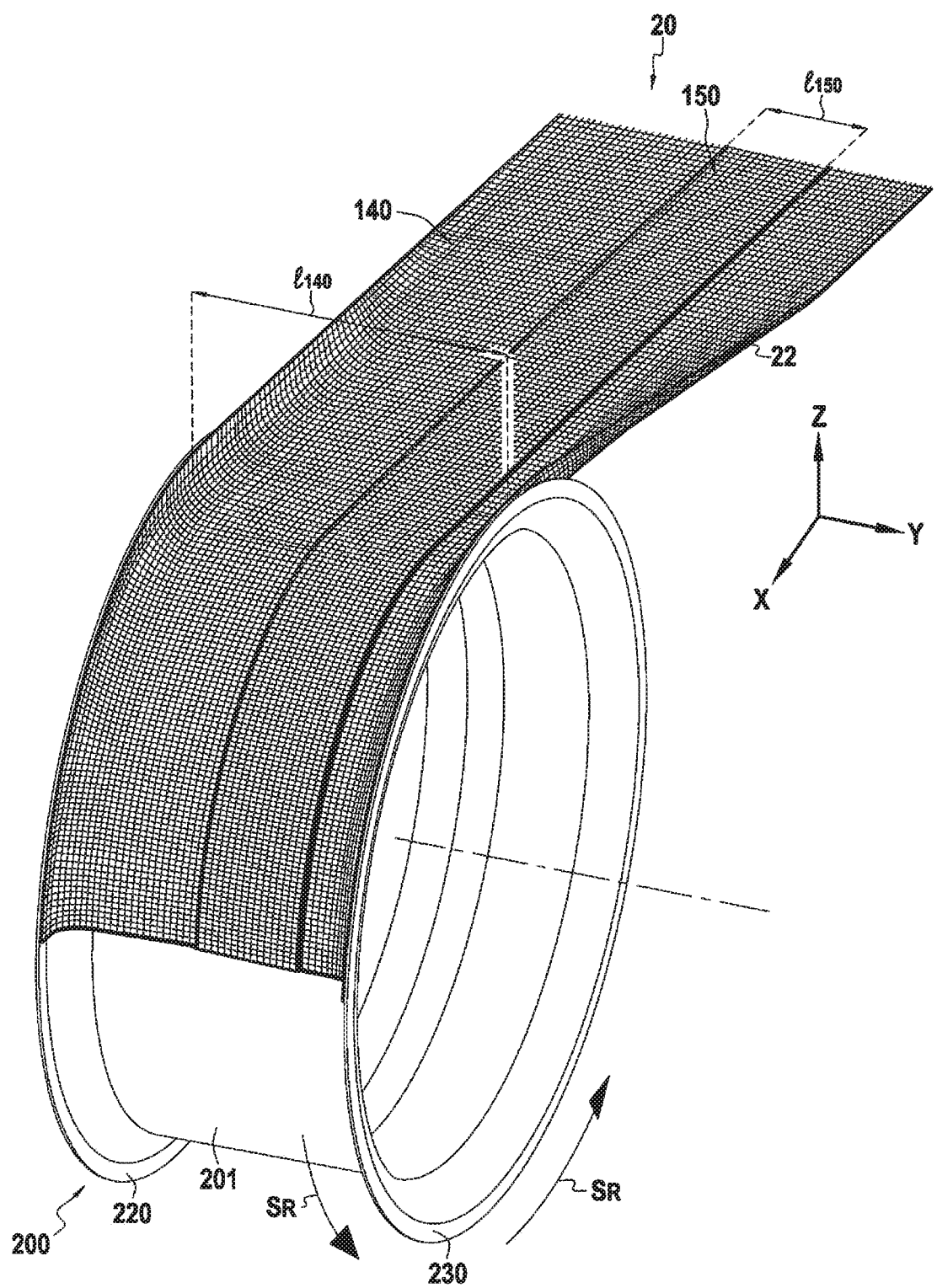
FIG. 4 is a perspective view showing the fiber texture and a textile strip being shaped in order to form the reinforcement of the fan casing of FIGS. 1 and 2.

As shown in FIGS. 3 and 4, the fiber texture 140 is in the form of a strip that extends lengthwise in a direction X corresponding to the travel direction of the warp yarns or strands 20 and width-wise or transversely in a direction Y corresponding to the direction of the weft yarns or strands 30.

The fiber structure may in particular be woven using yarns made of fibers of the following types: carbon; ceramic, e.g. silicon carbide; glass; or indeed aramid.

The textile strip 150 is woven independently using a Jacquard type loom as described above. The textile strip is made by three-dimensional or multilayer weaving, optionally using fibers of the same type as those in the fiber texture, the same three-dimensional weave as in the fiber texture, and with a warp-weft ratio substantially identical to that of the fiber texture.

The fiber texture and the textile strip are stored on reels or drums from which they are taken off while they are being wound jointly under tension onto shaping tooling.

As shown in FIG. 4, a fiber preform is formed by winding the fiber texture 140 made by three-dimensional weaving onto a mandrel 200 that has a profile corresponding to the profile of the casing to be made. In accordance with the invention, a textile strip 150 is wound together with the fiber texture 140, the strip 150 being positioned on the first layer 141 of the texture 140 wound on the mandrel 200 so as to interpose a textile strip layer 150 of smaller width between two adjacent fiber texture layers of greater width, which layers correspond to two winding revolutions of the fiber texture 140. The strip 150 is positioned at a location on the fiber texture 140 that corresponds to the retention zone that is to be formed in the casing.

Advantageously, the fiber preform constitutes complete tubular fiber reinforcement for the casing 100 constituting a single part with a thicker portion corresponding to the retention zone of the casing.

For this purpose, the mandrel 200 presents an outer surface 201 of profile that corresponds to the inner surface of the casing that is to be made. By being wound onto the mandrel 200, the fiber texture 140 fits closely to its profile. The mandrel 200 also has two cheekplates 220 and 230 for forming fiber preform portions that correspond to the flanges 104 and 105 of the casing 100.

While the fiber preform is being shaped by winding, the fiber texture 140 and the textile strip 150 are taken from the drums 60 and 70 respectively on which they are stored, and as shown in FIG. 5.

FIG. 6 is a section view of the fiber preform 300 obtained after winding the fiber texture 140 and the textile strip 150 as a plurality of layers on the mandrel 200. The number of layers or turns is a function of the desired thickness and of the thickness of the fiber texture. It is preferably not less than two. In the presently-described example, the preform 300 comprises four layers 141 to 144 of fiber texture 140 and three layers 151 to 153 of textile strip 150 interposed between the following adjacent layers respectively: 141 and 142; 142 and 143; and 143 and 144.

A fiber preform 300 is obtained having a thicker portion 310 formed by the layers 151 to 153 of textile strip 150 being interposed between the superposed layers 141 to 144 of fiber texture 140. The fiber preform 300 also has end portions 320 and 330 corresponding to the end portions 120 and 130 of the casing.

Thereafter, the fiber preform 300 is densified with a matrix.

Densifying the fiber preform consists in filling in the pores of the preform, throughout all or part of its volume, with the material that constitutes the matrix.

The matrix may be obtained in known manner using the liquid technique.

Figure 7:
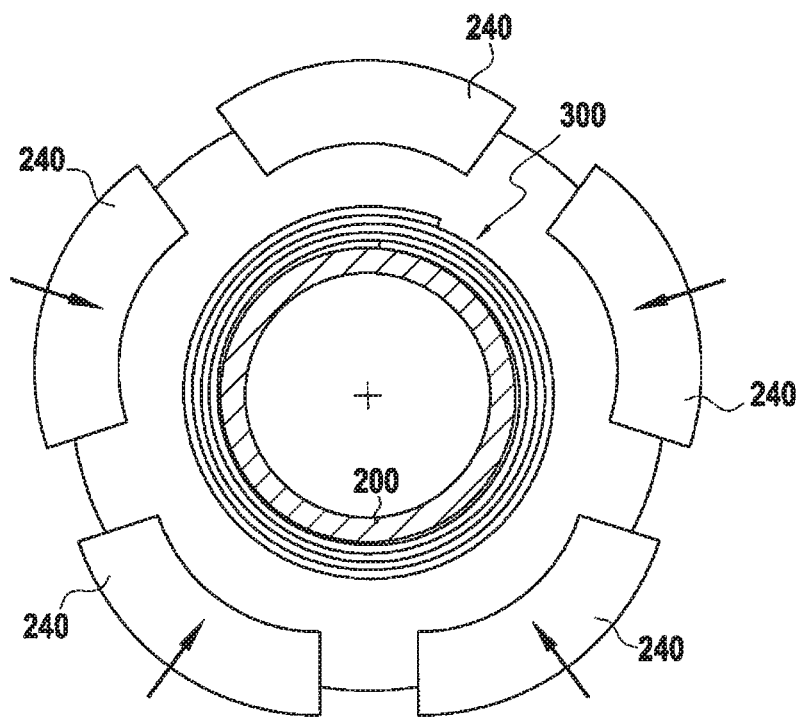
FIG. 7 is a diagrammatic view showing tooling for densifying the FIG. 6 fiber preform with a matrix.
Figure 8:
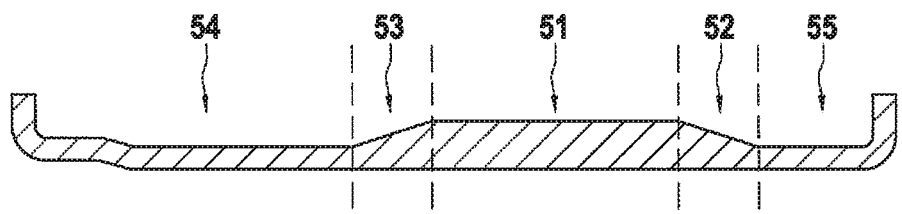
FIG. 8 is a diagrammatic section view of a prior art casing made of composite material.

The liquid technique consists in impregnating the preform with a liquid composition containing an organic precursor for the material of the matrix. The organic precursor is usually in the form of a polymer, such as a resin, possibly diluted in a solvent. The fiber preform is placed in a mold that may be closed in leaktight manner with a recess having the shape of the final molded part. As shown in FIG. 7, the fiber preform 300 in this example is placed between a plurality of sectors 240 forming a mold cover and the mandrel 200 forming a support, these elements presenting respectively the outside shape and the inside shape of the casing that is to be made. Thereafter, the liquid matrix precursor, e.g. a resin, is injected into the entire recess in order to impregnate all of the fiber portion of the preform.

The precursor is transformed into an organic matrix, i.e. it is polymerized, by performing heat treatment, generally by heating the mold, after eliminating any solvent and clearing the polymer, with the preform continuing to be held in the mold of shape matching the shape of the part that is to be made. The organic matrix may in particular be obtained using epoxy resins, such as for example a commercially available high-performance epoxy resin, or from liquid precursors for carbon or ceramic matrices.

When forming a carbon or ceramic matrix, the heat treatment consists in hydrolyzing the organic precursor in order to transform the organic matrix into a carbon or ceramic matrix, depending on the precursor used and on the pyrolysis conditions. By way of example, liquid precursors for carbon may be resins having a relatively high coke content, such as phenolic resins, whereas liquid precursors for ceramic, and in particular for SiC, may be resins of polycarbosilane (PCS) or polytitanocarbosilane (PTCS) or polysilazane (PSZ) type. Several consecutive cycles going from impregnation to heat treatment may be performed in order to achieve the desired degree of densification.

In an aspect of the invention, the fiber preform may be densified by the well-known resin transfer molding (RTM) method. In the RTM method, the fiber preform is placed in a mold having the shape of the casing that is to be made. A thermosetting resin is injected into the inside space defined between the mandrel 200 and the mold covers 240 and containing the fiber preform. A pressure gradient is generally established in that inside space between the location where the resin is injected and resin discharge orifices, so as to control and optimize impregnation of the preform with the resin.

By way of example, the resin used may be an epoxy resin. Resins that are appropriate for RTM methods are well known. They preferably present low viscosity in order to facilitate being injected between the fibers. The temperature class and/or the chemical nature of the resin is selected as a function of the thermomechanical stresses to which the part is to be subjected. Once resin has been injected throughout the reinforcement, it is polymerized by heat treatment in compliance with the RTM method.

After injection and polymerization, the part is unmolded. The part is finally trimmed to remove excess resin and chamfers are machined in order to obtain the casing 100 shown in FIGS. 1 and 2.

Figure 9:
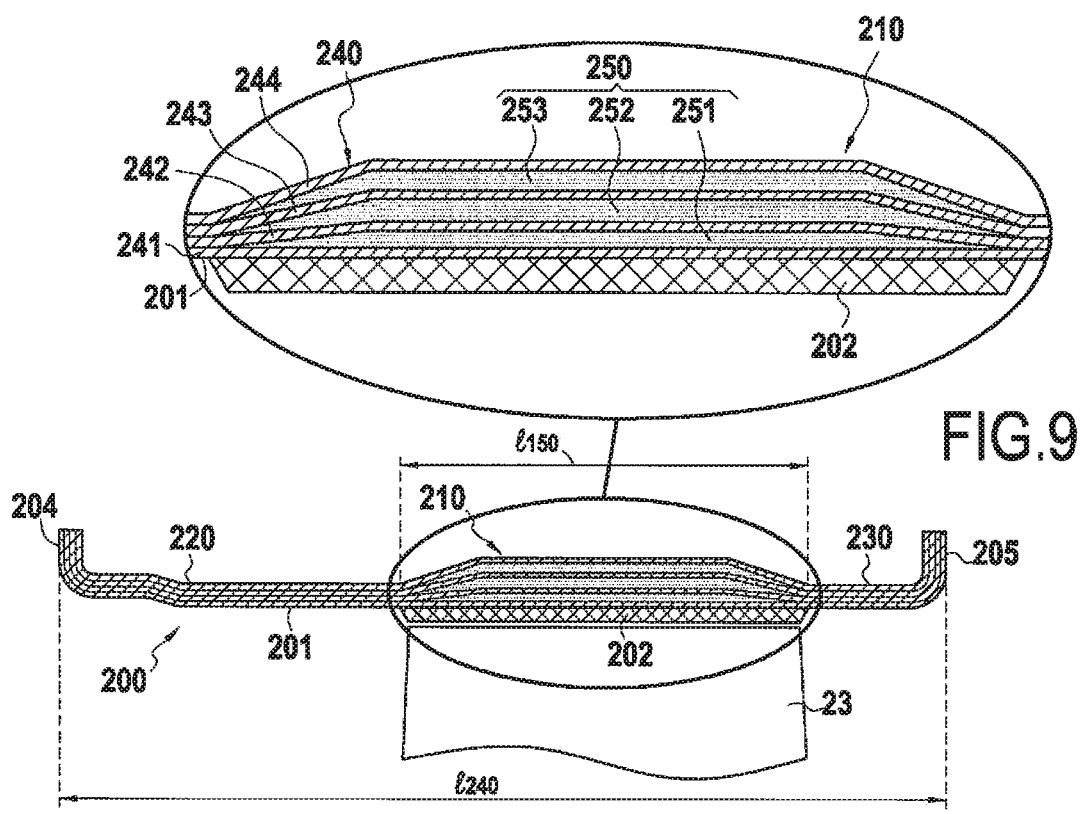
FIG. 9 is a section view of a fan casing made of composite material in accordance with another embodiment of the invention.

In a variant implementation of the invention, while the fiber texture is being wound on the mandrel, an aerated material is interposed between the adjacent turns of the fiber texture. As shown in FIG. 9, this makes it possible to obtain a casing 200 in which the reinforcement is constituted by a plurality of superposed layers 241 to 244 of a fiber texture 240 in the form of a strip presenting three-dimensional or multilayer weaving, each layer 241 to 244 corresponding to one winding revolution of the fiber texture 240, with an aerated material 250, in the form of a strip in this example, being interposed between two adjacent layers of the fiber texture. The strip of aerated material 250 presents a width $l_{250}$ that is less than the width $l_{240}$ of the fiber texture 240, and it defines the retention zone of the casing 200. In the presently-described example, three layers 251 to 253 of aerated material 250 are interposed between the superposed layers 241 to 244 of the fiber texture 240, each layer 251 to 253 corresponding to one winding revolution of the strip of aerated material 250. In general manner, for n superposed layers of fiber texture, each corresponding to one winding revolution of said fiber texture, there are n−1 layers of aerated material, each corresponding to one winding revolution of said textile strip.

By interposing a layer of aerated material in this way between the adjacent layers of the fiber texture used for forming the fiber reinforcement of the casing, it is possible to form a thicker portion in the casing that is suitable for constituting a retention shield or zone, while minimizing the overall weight of the resulting casing compared with a casing in which the thicker portion is made solely with a fiber texture presenting varying thickness, as in Document EP 1 961 923.

The aerated material may present various different forms, such as for example a continuous strip or a plurality of segments that are added end to end as winding advances. It may also present various shapes. In particular, across its width, it may present a profile of varying thickness making it possible to define a thicker portion of thickness that varies in the width direction of the fiber reinforcement.

The aerated material may in particular be made from a foam or a honeycomb type cellular structure. In the presently-described example, the aerated material 250 is constituted by a strip of foam.

With a foam, it preferably presents a compression ratio that is relatively small so that it is not excessively flattened during winding with the fiber texture, thereby ensuring that the thicker portion is formed. The foam used is preferably suitable for conserving its integrity and its properties, and in particular its compressibility properties at temperatures of about 200° C. and at pressures of about 1 MPa, which correspond to the conditions of fabricating the composite material casing, i.e. it is suitable for withstanding those temperatures and pressures.

By way of non-limiting example, a foam of Rohacell® type, e.g. the Rohacell® XT foam, may be used to form a strip of aerated material that is to be interposed between the adjacent layers of the wound fiber texture. If the foam is rigid, it may be added in segments progressively during the winding of the fiber preform, which itself is flexible.

As mentioned above, it is also possible to use a cellular structure since such a structure is easily windable and presents good ability to withstand compression. The cellular structure may in particular be a Nomex® honeycomb from Hexcel®.

The method of fabricating the fan casing 200 corresponds to the above-described method of fabricating the casing 100, the only difference being that a layer of aerated material is interposed between adjacent turns of the fiber texture instead of a textile strip.

Figure 10:
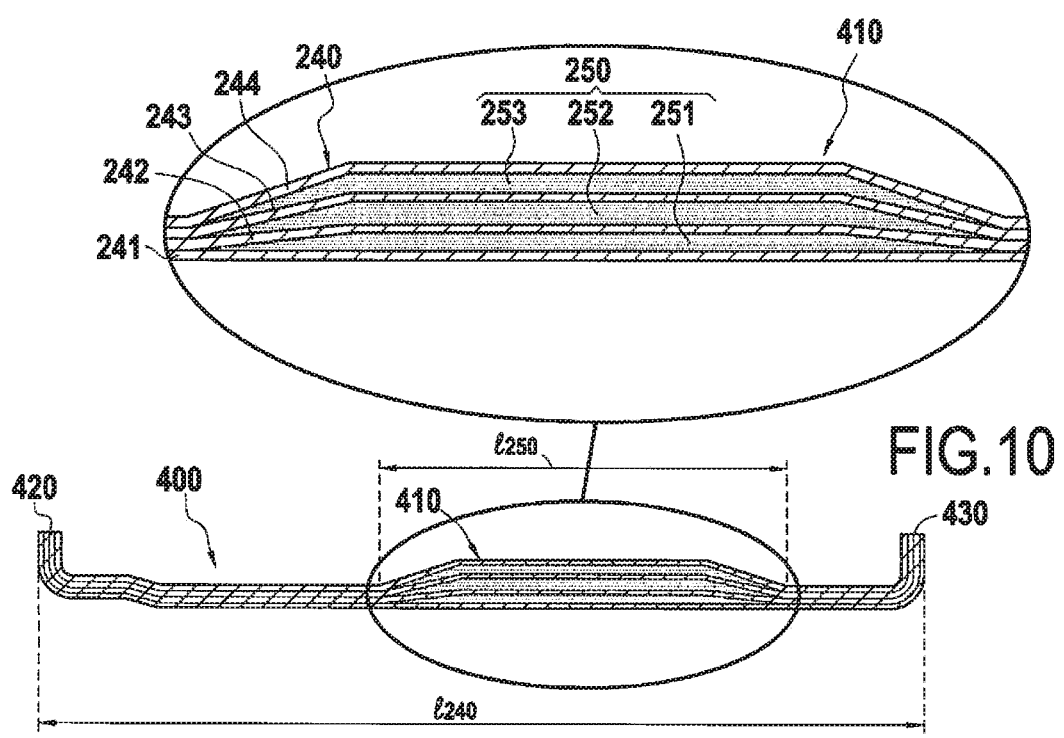
FIG. 10 is a section view showing the profile of the fiber preform that is obtained after winding the fiber structure and an aerated material.

FIG. 10 is a section view of the fiber preform 400 obtained after winding the fiber texture 240 and the strip of aerated material 250 as a plurality of layers on a mandrel. The number of layers or turns is a function of the desired thickness and of the thickness of the fiber texture. It is preferably not less than two. In the presently-described example, the preform 400 comprises four layers 241 to 244 of fiber texture 240, and three layers 251 to 253 of aerated material strip 250 interposed between the following adjacent layers respectively: 241 and 242; 242 and 243; and 243 and 244.

A fiber preform 400 is obtained with a thicker portion 310 formed by interposing layers 251 to 253 of the aerated material strip 250 between the superposed layers 241 to 244 of the fiber texture 240. The fiber preform 400 also has end portions 420, 430 corresponding to the flanges 204 and 205 of the casing (FIG. 9).

Thereafter, the fiber preform 400 is densified with a matrix in the same manner as described above for the preform 300.

After injection and polymerization, the part is unmolded. Finally, the part is trimmed in order to remove excess resin, and chamfers are machined in order to obtain the casing 200 shown in FIG. 9.

The invention claimed is:

1. A method of fabricating a composite material casing of varying thickness between an upstream flange and a downstream flange thereof for a gas turbine, the method comprising:
using three-dimensional or multilayer weaving to make a fiber texture in the form of a strip;
winding the fiber texture as a plurality of superposed layers onto a mandrel of profile corresponding to the profile of the casing to be fabricated, so as to obtain a fiber preform of shape corresponding to the shape of the casing to be fabricated; and
densifying the fiber preform with a matrix;
wherein, during winding of the fiber texture on the mandrel, a textile strip or an aerated material is interposed between the adjacent turns of the fiber texture such that the textile strip or the aerated material is provided between the upstream flange and the downstream flange, the textile strip or the aerated material presenting a width that is less than a width of the fiber texture, the width of the fiber texture being defined by and extending between ends of the upstream flange and the downstream flange, and defining a retention zone of the casing, and wherein at least one of the plurality of superposed layers defines an outer layer of the casing.

2. The method according to claim 1, wherein the fibers of the fiber texture and the fibers of the textile strip are selected from at least one of the following types: carbon; glass; aramid; and ceramic.

3. The method according to claim 1, wherein the textile strip is made with fibers of the same type as the fibers of the fiber texture.

4. The method according to claim 1, wherein the textile strip is made with three-dimensional weaving having the same weave as the three-dimensional weaving of the fiber texture.

5. The method according to claim 1 wherein the textile strip presents a warp-weft ratio that is substantially identical to the warp-weft ratio of the fiber texture.

6. The method according to claim 1, wherein the aerated material is made from a foam or from a cellular structure.

7. A gas turbine fan casing having varying thickness between an upstream flange and a downstream flange thereof and made of a composite material with fiber reinforcement comprising a plurality of superposed layers of a fiber texture in the form of a strip presenting three-dimensional or multilayer weaving, said strip having a width defined by and extending between ends of the upstream flange and the downstream flange, said fiber reinforcement being densified by a matrix, and wherein at least one of the plurality of superposed layers of the fiber texture defines an outer layer of the casing;
wherein a textile strip or an aerated material is provided between the upstream flange and the downstream flange and interposed between two adjacent layers of the fiber texture, the textile strip or the aerated material presenting a width that is less than the width of the fiber texture and defining a retention zone of the casing.

8. The casing according to claim 7, wherein the fibers of the fiber texture and the fibers of the textile strip are selected from at least one of the following types: carbon; glass; aramid; and ceramic.

9. The casing according to claim 7, wherein the textile strip is made with fibers of the same type as the fibers of the fiber texture.

10. The casing according to claim 7, wherein the textile strip presents three-dimensional weaving having the same weave as the three-dimensional weaving of the fiber texture.

11. The casing according to claim 7 wherein the textile strip presents a warp-weft ratio that is substantially identical to the warp-weft ratio of the fiber texture.

12. The casing according to claim 7 wherein the fiber reinforcement comprises n layers of fiber texture corresponding to n winding revolutions of said fiber texture, and n−1 layers of textile strip corresponding to n−1 winding revolutions of said textile strip.

13. The casing according to claim 7, wherein the aerated material is made from a foam or a cellular structure.

14. A gas turbine aeroengine having a fan casing according to claim 7.

* * * * *